(12) United States Patent
Yamamoto et al.

(10) Patent No.: US 12,491,595 B2
(45) Date of Patent: Dec. 9, 2025

(54) MACHINE TOOL CONTROL DEVICE

(71) Applicant: FANUC CORPORATION, Yamanashi (JP)

(72) Inventors: Kenta Yamamoto, Yamanashi (JP); Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 669 days.

(21) Appl. No.: 17/904,685

(22) PCT Filed: Feb. 18, 2021

(86) PCT No.: PCT/JP2021/006169
§ 371 (c)(1),
(2) Date: Aug. 19, 2022

(87) PCT Pub. No.: WO2021/167014
PCT Pub. Date: Aug. 26, 2021

(65) Prior Publication Data
US 2023/0072167 A1    Mar. 9, 2023

(30) Foreign Application Priority Data
Feb. 20, 2020 (JP) ................. 2020-027474

(51) Int. Cl.
*B23Q 15/013* (2006.01)
*B23B 1/00* (2006.01)
(Continued)

(52) U.S. Cl.
CPC .............. *B23Q 15/013* (2013.01); *B23B 1/00* (2013.01); *B23B 25/02* (2013.01); *G05B 19/4093* (2013.01)

(58) Field of Classification Search
None
See application file for complete search history.

(56) References Cited

U.S. PATENT DOCUMENTS

2006/0251480 A1* 11/2006 Mann ................. B23P 17/06
408/1 R
2017/0075337 A1* 3/2017 Kameta ............... G05B 19/402
(Continued)

FOREIGN PATENT DOCUMENTS

CN    108732989 A    11/2018
CN    109426214 A    3/2019
(Continued)

OTHER PUBLICATIONS

International Search Report issued in PCT/JP2021/006169; mailed Apr. 6, 2021.

*Primary Examiner* — Ryan A Jarrett
(74) *Attorney, Agent, or Firm* — Studebaker Brackett PLLC

(57) ABSTRACT

Provided is a machine tool control device capable of promptly determining a frequency parameter and an amplitude parameter for a desired oscillation instruction enabling shredding of a chip. A machine tool control device 1 performs machining while causing a tool T and a workpiece W to oscillate relative to each other. The machine tool control device 1 is provided with an oscillation instruction calculation unit 113 that calculates an instruction for an oscillating operation; a first oscillation condition determination unit 111 that determines, as a first oscillation condition, one of a frequency parameter constituted of a frequency or a frequency multiplying factor of the oscillation instruction, and an amplitude parameter constituted of an amplitude or an amplitude multiplying factor of the oscillation instruction; and a second oscillation condition calculation unit 112 that calculates, as a second oscillation condition, the other of the frequency parameter and the amplitude parameter on the basis of the first oscillation condition determined by the first oscillation condition determination unit 111.

19 Claims, 6 Drawing Sheets

(51) Int. Cl.
    *B23B 25/02*     (2006.01)
    *G05B 19/4093*     (2006.01)

(56) References Cited

U.S. PATENT DOCUMENTS

2020/0306916 A1* 10/2020 Morihashi .............. B23Q 15/22
2020/0379433 A1* 12/2020 Watanabe ............ G05B 19/414

FOREIGN PATENT DOCUMENTS

| | | |
|---|---|---|
| JP | 2001-150201 A | 6/2001 |
| JP | 2009-535229 A | 10/2009 |
| JP | 2016-182655 A | 10/2016 |
| JP | 2017-056515 A | 3/2017 |
| JP | 2018-083257 A | 5/2018 |

\* cited by examiner

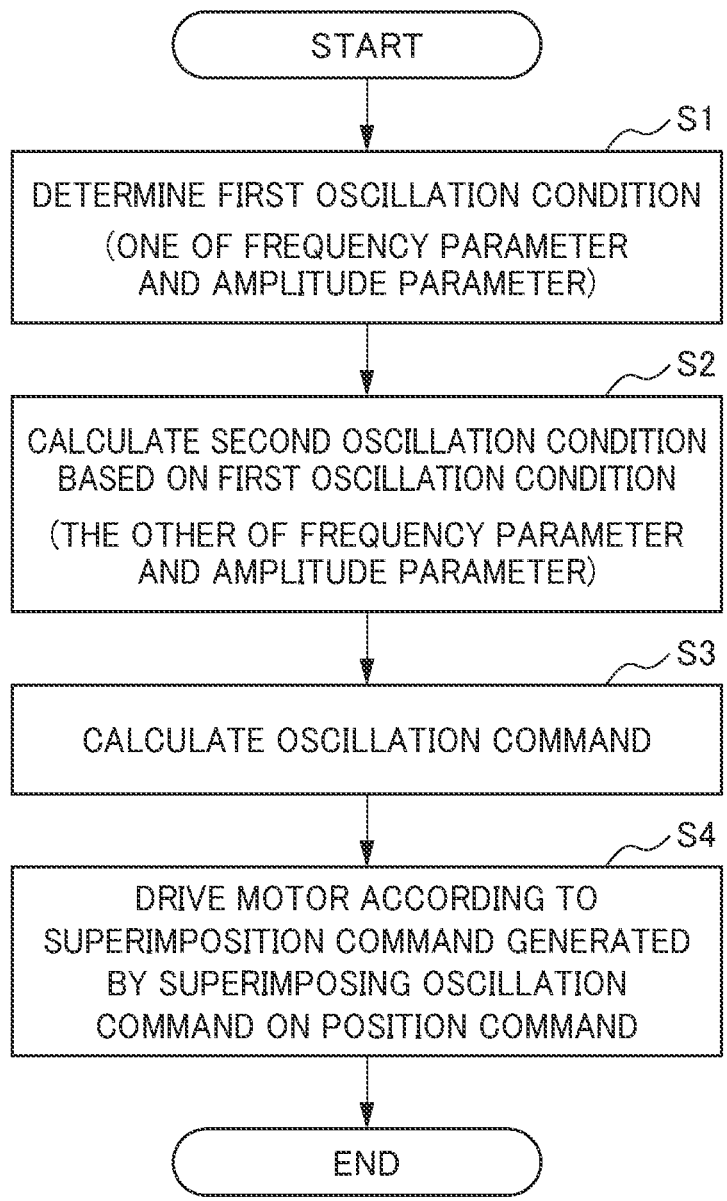

MACHINE TOOL CONTROL DEVICE

TECHNICAL FIELD

The present disclosure relates to a machine tool controller.

BACKGROUND ART

Conventionally, it is known that chips generated continuously at the time of cutting a workpiece using a cutting tool become entangled with the cutting tool to cause defective parts, intermittent stops, and mechanical failure. On the other hand, oscillation cutting has been proposed in which a cutting process is performed while a cutting tool and a workpiece oscillate relative to each other to shred chips (for example, see Patent Document 1).

Patent Document 1: Japanese Unexamined Patent Application, Publication No. 2017-56515.

DISCLOSURE OF THE INVENTION

Problems to be Solved by the Invention

However, in the conventional oscillation cutting, since a frequency parameter (a frequency or a frequency multiplying factor; the same applies hereinafter) and an amplitude parameter (an amplitude or an amplitude multiplying factor; the same applies hereinafter) of an oscillation command are determined by setting conditions such that chips can be shredded, it takes time yet.

Therefore, it is desirable that a frequency parameter and an amplitude parameter of the desired oscillation command enabling shredding of chips can be quickly determined in the machine tool controller that executes the oscillation cutting.

Means for Solving the Problems (1) An aspect of the present disclosure is directed to a machine tool controller for a machine tool that performs machining while causing a tool and a workpiece to oscillate relative to each other. The machine tool controller includes: an oscillation command calculation unit that calculates an oscillation command; a first oscillation condition determination unit that determines, as a first oscillation condition, one of a frequency parameter and an amplitude parameter, the frequency parameter including a frequency or a frequency multiplying factor of the oscillation command, the amplitude parameter including an amplitude or an amplitude multiplying factor of the oscillation command; and a second oscillation condition calculation unit that calculates, as a second oscillation condition, the other of the frequency parameter and the amplitude parameter, based on the first oscillation condition determined by the first oscillation condition determination unit.

Effects of the Invention

According to the present disclosure, it is possible to provide a machine tool controller capable of quickly determining a frequency parameter and an amplitude parameter of a desired oscillation command capable of shredding chips, using a correlation between the frequency parameter and the amplitude parameter.

BRIEF DESCRIPTION OF THE DRAWINGS

FIG. 7 is a flowchart showing a procedure of the cutting process according to the embodiments of the present disclosure.

PREFERRED MODE FOR CARRYING OUT THE INVENTION

Embodiments of the present disclosure will be described below in detail with reference to the drawings.

Figure 1:
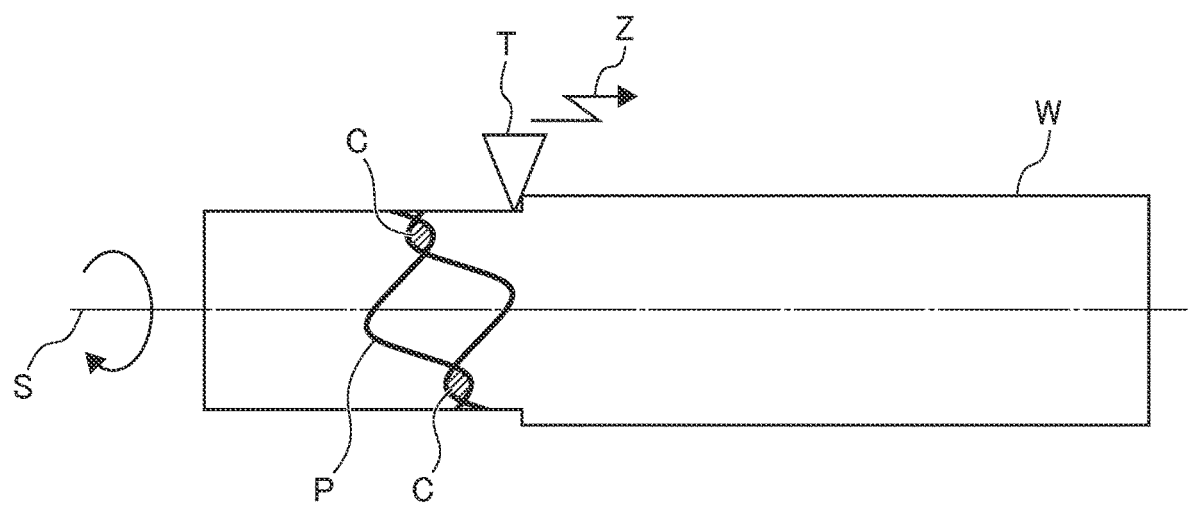
FIG. 1 is a view showing a cutting process according to embodiments of the present disclosure.

FIG. 1 is a view showing a cutting process according to embodiments of the present disclosure. As shown in FIG. 1, machine tool controllers according to the embodiments allow at least one spindle S that rotates a cutting tool T and a workpiece W relative to each other and at least one feed shaft that moves the cutting tool T relative to the workpiece W to operate, whereby the workpiece W is cut with the cutting tool T. FIG. 1 shows an example in which the cutting tool T is moved in a feed direction Z by the feed shaft to perform cutting on an outer circumference surface of the columnar workpiece W that is being rotated by the spindle S.

Further, the cutting process according to the present embodiments can shred chips generated continuously by cutting in a manner that the cutting tool T and the workpiece W are rotated relative to each other and the cutting process is performed while the cutting tool T and the workpiece W oscillate relative to each other in the feed direction Z. The chips become entangled with the cutting tool T during machining and cause defective parts, intermittent stops, and machine failure, which can be avoided in the present embodiments.

More specifically, as shown in FIG. 1, a tool path P, which is a path of the cutting tool T, is set so that the current path overlaps the previous path. In other words, the setting is provided such that a part cut in the previous path is included in the current path. In the example shown in FIG. 1, a phase of a peak portion in the feed direction Z of the previous path coincides with a phase of a valley portion of the current path, and a part cut in the previous path is set to be included in the current path. For this reason, an idle swing C (air cut) occurs in which a cutting tip of the cutting tool T is separated from a surface of the workpiece W. Thus, chips are reliably shredded.

Figure 2:
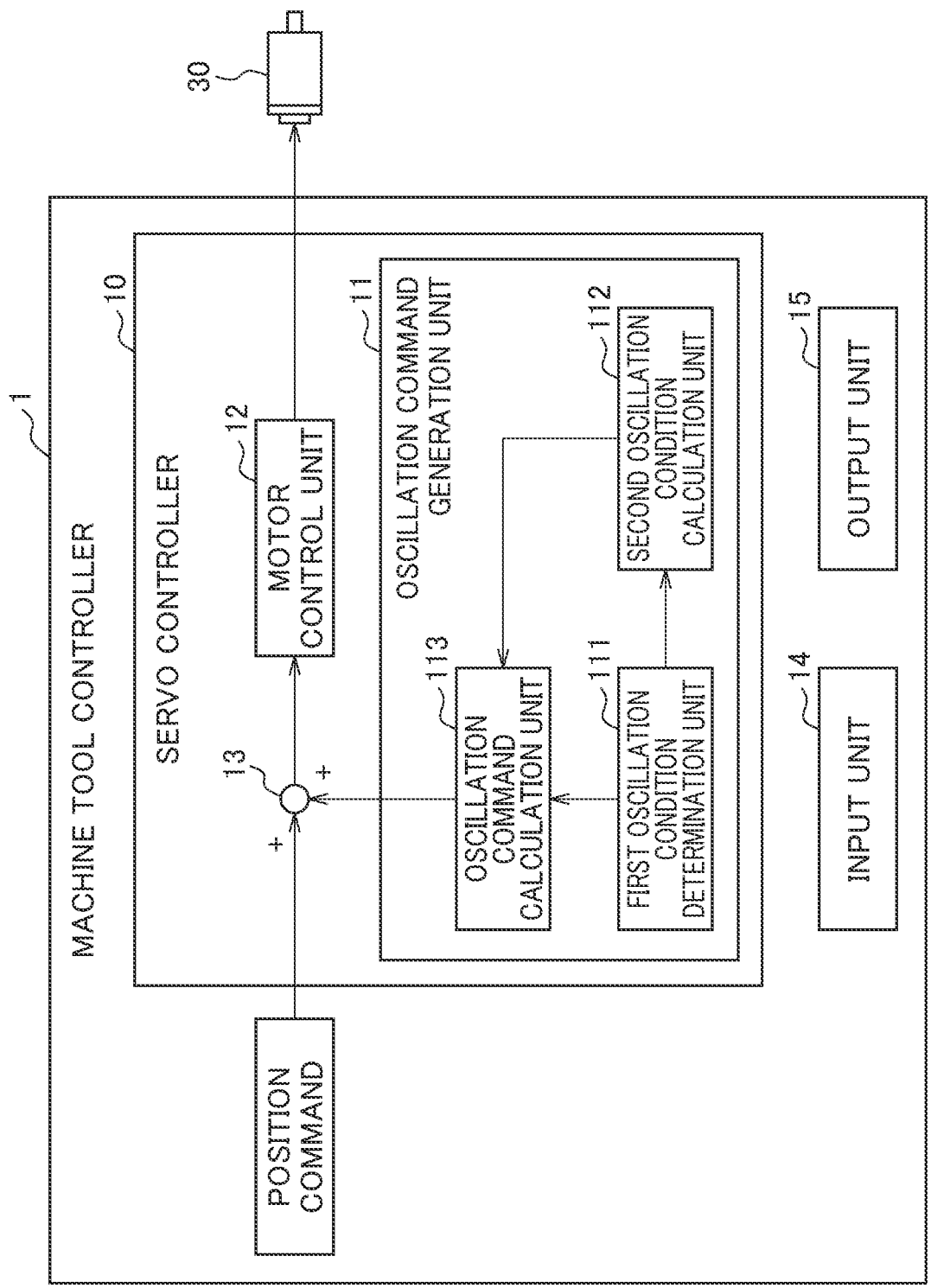
FIG. 2 is a functional block diagram of a machine tool controller according to a first embodiment of the present disclosure.

FIG. 2 is a functional block diagram of a machine tool controller 1 according to a first embodiment of the present disclosure. As shown in FIG. 2, the machine tool controller 1 according to the present embodiment includes a servo controller 10 and controls driving of a motor 30 that drives a feed shaft.

As shown in FIG. 2, the machine tool controller 1 according to the present embodiment includes an oscillation command generation unit 11, a motor control unit 12, an adder 13, an input unit 14, and a display unit 15.

The machine tool controller 1 according to the present embodiment generates a drive command for the motor 30 according to a machining program. The generated drive command (for example, a position command) is input to the adder 13 of the servo controller 10, which will be described later, as shown in FIG. 2.

Further, the machining program of the machine tool controller 1 according to the present embodiment is created in a manner that tool information and tool operation information are set by a CAM system (not shown) for a machining shape created by a CAD system (not shown), for example.

The oscillation command generation unit 11 generates an oscillation command that makes the cutting tool T and the workpiece W to oscillate relative to each other in the feed direction Z. The generated oscillation command is input to the adder 13 which will be described later. As shown in FIG. 2, the oscillation command generation unit 11 includes a first oscillation condition determination unit 111, a second oscillation condition calculation unit 112, and an oscillation command calculation unit 113.

The first oscillation condition determination unit 111 determines, as a first oscillation condition, one of a frequency parameter including a frequency or a frequency multiplying factor constituting the oscillation command and an amplitude parameter including an amplitude or an amplitude multiplying factor constituting the oscillation command. Next, as will be described later, the second oscillation condition calculation unit 112 calculates, as a second oscillation condition, the other by using a correlation between the frequency parameter and the amplitude parameter. Thereby, it is possible to shorten a time for setting conditions, which has been conventionally confirmed while setting one by one.

More specifically, the first oscillation condition determination unit 111 preferably determines the first oscillation condition based on at least one of a chip length, surface roughness of the workpiece W, an oscillation width, or an upper limit value of the first oscillation condition. Hereinafter, a method of determining the first oscillation condition based on each of the chip length, the surface roughness, the oscillation width, and the upper limit value of the first oscillation condition will be described with example.

For example, when the first oscillation condition determination unit 111 determines the frequency multiplying factor as the first oscillation condition based on the chip length, a numerical expression (1-1) below is used.

[Math. 1]

$$I = \frac{\pi D}{L} \qquad \text{NUMERICAL EXPRESSION (1-1)}$$

In the above numerical expression (1-1), I represents a frequency multiplying factor, D represents a diameter (mm) of the workpiece W, and L represents a chip length (mm). The diameter D of the workpiece W can be obtained from coordinate values of the tool positioned in a radial direction of the workpiece during machining. The frequency multiplying factor I is obtained by substitution of the desired chip length L into the above numerical expression (1-1). Using a numerical expression (2-2) to be described later that defines a relationship between the frequency multiplying factor and the frequency, a frequency as the first oscillation condition can also be obtained from the desired chip length L.

Further, for example, when the first oscillation condition determination unit 111 determines the frequency multiplying factor as the first oscillation condition based on the surface roughness, a maximum value of the surface roughness according to the frequency multiplying factor is held as a table, and the frequency multiplying factor can be determined from the desired surface roughness.

Figure 3:
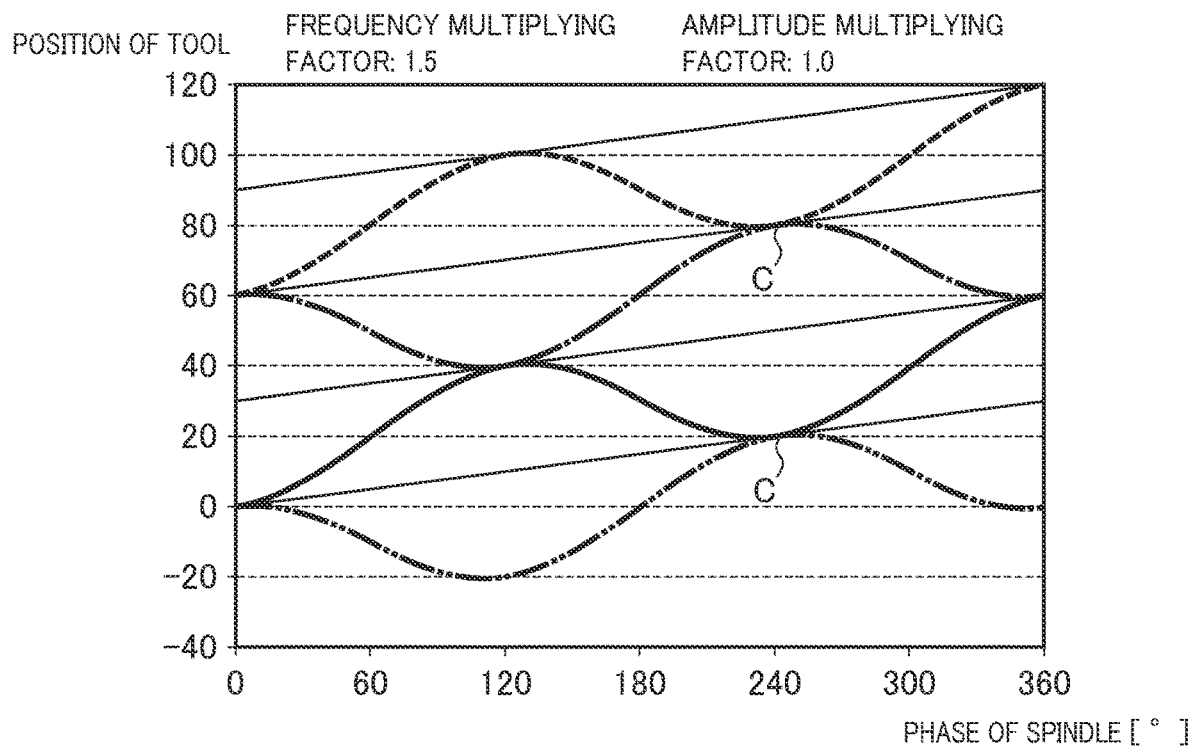
FIG. 3 is a diagram showing an example of a relationship of a spindle phase and a position of a cutting tool.
Figure 4:
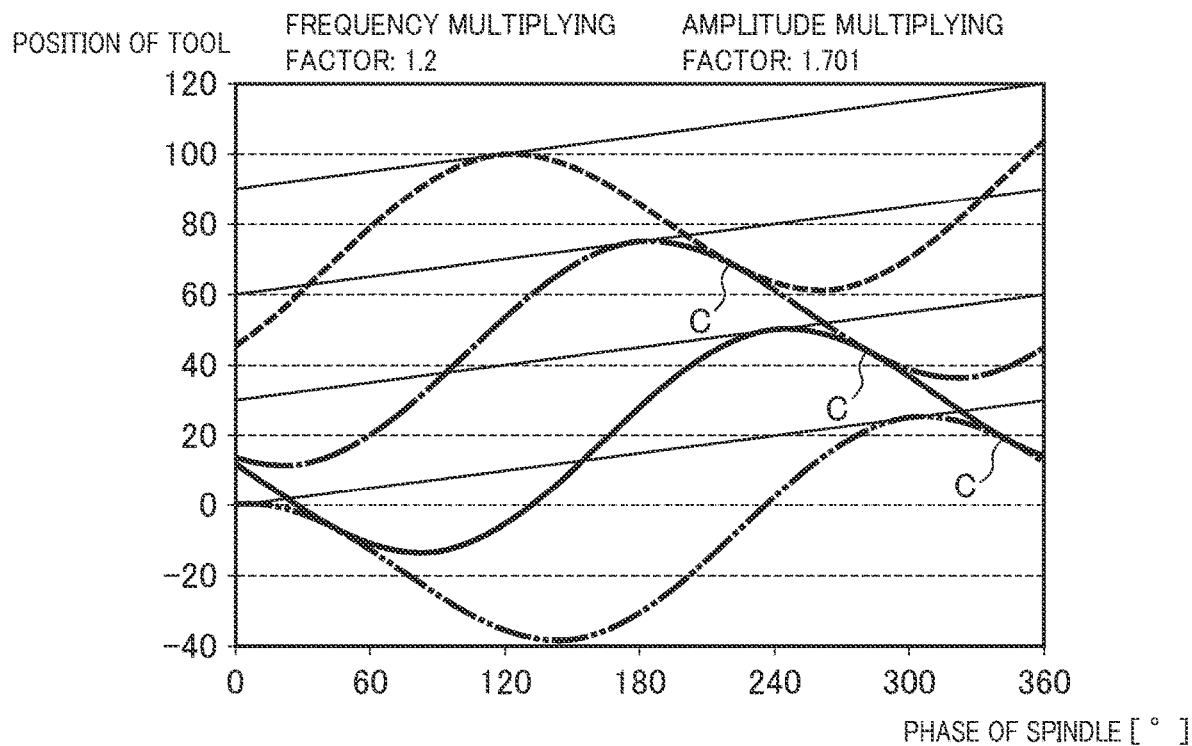
FIG. 4 is a diagram showing another example of a relationship of a spindle phase and a position of a cutting tool.

Further, instead of the surface roughness itself, a variation in the surface roughness for each workpiece phase may be obtained as a standard deviation, and a relationship between the standard deviation and the frequency multiplying factor may be held as a table. Here, variations in surface roughness during the cutting process with oscillation will be described with reference to FIGS. 3 and 4. FIGS. 3 and 4 are diagrams showing an example and another example of a relationship between a spindle phase and a position of the cutting tool T. Specifically, FIG. 3 shows a relationship between a spindle phase and a position of the cutting tool T when a frequency multiplying factor I as the first oscillation condition is 1.5, and an amplitude multiplying factor K as the second oscillation condition calculated from a numerical expression (2-1) to be described later is 1.0. In addition, FIG. 4 shows a relationship between a spindle phase and a position of the cutting tool T when a frequency multiplying factor I as the first oscillation condition is 1.2, and an amplitude multiplying factor K as the second oscillation condition calculated from the numerical expression (2-1) to be described later is 1.701.

As is clear from FIG. 3, a phase per rotation of the spindle is shifted by half a cycle, and thus a phase of a peak portion in a previous tool path coincides with a phase of a valley portion in a current tool path in a specific spindle phase. A change in a feed amount per rotation of the spindle becomes large in the specific phase, for example, in the vicinity of a spindle phase of 120°. As a result, the surface unevenness of the workpiece becomes large due to the influence of a corner radius of a tool tip, and the surface roughness becomes large. On the contrary, the feed amount per rotation of the spindle is always constant in the vicinity of the spindle phase of 180°, and the surface roughness becomes small. In such a case, the variation in surface roughness becomes large depending on the spindle phase.

On the other hand, in the case of FIG. 4, the spindle phase is not constant in which the feed amount per rotation of the spindle becomes large. In such a case, the variation in surface roughness becomes small depending on the spindle phase. Since the variation in surface roughness may affect the circularity of the machined workpiece, the first oscillation condition may be determined by the variation in surface roughness.

Further, the oscillation amplitude may be obtained from the width of the oscillation. Specifically, when the width of the oscillation is X (mm), K'=X and K=X/F are set using a numerical expression (2-3) to be described later.

Further, a frequency and an amplitude of an oscillation motion are determined in a range in which the oscillation motion can be performed according to the machine tool. The first oscillation condition may be determined by clamping with an upper limit value for a desired frequency or amplitude.

The second oscillation condition calculation unit 112 calculates, as the second oscillation condition, the other of the frequency parameter and the amplitude parameter based on the first oscillation condition determined by the first oscillation condition determination unit 111 described above. Further, the second oscillation condition calculation unit 112 calculates the second oscillation condition based on the first oscillation condition and either the number of tools or the number of blades.

More specifically, the second oscillation condition calculation unit 112 calculates the second oscillation condition using the following numerical expressions (2-1), (2-2), and (2-3).

[Math. 2]

$$nK \cdot \left|\sin\left(\frac{\pi I}{n}\right)\right| > 1 \quad \text{NUMERICAL EXPRESSION (2-1)}$$

$$\frac{SI}{60} = I' \quad \text{NUMERICAL EXPRESSION (2-2)}$$

$$FK = K' \quad \text{NUMERICAL EXPRESSION (2-3)}$$

Here, in the above numerical expressions (2-1), (2-2), and (2-3), I represents a frequency multiplying factor, K represents an amplitude multiplying factor, n represents the number of tools or the number (piece) of blades of the tool, I' represents a vibration frequency (Hz), S represents spindle rpm (minute$^{-1}$), K' represents an amplitude (mm), and F represents a feed rate (mm/rotation). For example, when the frequency multiplying factor T is 1, it means one oscillation with one rotation of the spindle. Further, when the amplitude multiplying factor K is 1, it means that the amplitude is the same as the feed amount (movement amount in the feed direction) per rotation of the spindle.

Further, using the above numerical expression (2-2), the other value can be calculated from one value of the frequency and the frequency multiplying factor. Similarly, using the above numerical expression (2-3) the other value can be calculated from one value of the amplitude and the amplitude multiplying factor. Therefore, the second oscillation condition can be calculated based on the first oscillation condition, using the relationship between these numerical expressions (2-2) and (2-3) and the numerical expression (2-1).

Further, it is preferable that the second oscillation condition calculation unit 112 calculates the amplitude parameter as the second oscillation condition including a margin based on a cutting tip of the cutting tool T and shaking of the workpiece W. Since the cutting tip (machine tip) of the cutting tool T and the workpiece W bend and shake due to the oscillation, idle swing C can be surely generated and chips can be shredded by calculation of the amplitude parameter including the margin based on the related shaking.

Here, since the frequency parameter and the amplitude parameter of the oscillation command need to be finally determined according to the cutting process, the frequency parameter and the amplitude parameter need to be set by a user of the machine tool. However, it is difficult for the user to set the above-described upper limit value of each machine and how much margin needs to be provided because of a difference depending on the machine tool. Therefore, a designer of the machine tool sets the upper limit value of the machine tool and the margin of the machine tool. Then, the user sets conditions, for example, a diameter of the workpiece W, an orifice diameter in drilling and cutting processes, and a length of chips, whereby the first oscillation condition and the second oscillation condition can be automatically determined and the oscillation cutting can be easily performed.

Specifically, the machine designer sets an amplitude multiplying factor K1 corresponding to a margin based on the shaking of the cutting tip and the workpiece K such that the chips can be shredded under an oscillation condition near the upper limit value of the machine. Separately, the upper limit value of the machine tool is also set. Next, the frequency multiplying factor I as the first oscillation condition is determined from a value input to the machine tool controller 1 by the user and the upper value of the machine. Then, an amplitude multiplying factor K2 required for the idle swing C is calculated using the above numerical expression (2-1) from the determined frequency multiplying factor I, and a final amplitude multiplying factor can be calculated as K=K1×K2.

Returning to FIG. 2, the oscillation command calculation unit 113 calculates an oscillation command based on the first oscillation condition determined by the first oscillation condition determination unit 111 and the second oscillation condition calculated by the second oscillation condition calculation unit 112.

Further, the oscillation command calculation unit 113 synchronizes the phase of the oscillation command with the phase of the spindle that relatively rotates the cutting tool T and the workpiece W, and thus shifting of the phase of the idle swing from the phase of the spindle disappears. Thus, chips can be reliably shredded even under the first oscillation condition and the second oscillation condition calculated using the correlation between the frequency parameter and the amplitude parameter.

The adder 13 generates a superimposition command. Specifically, the adder 13 generates a superimposition command by adding (superimposing) the oscillation command generated by the above-described oscillation command generation unit 11 to an integrated value of the position error, which is a difference between a position feedback based on position detection by the encoder provided in the motor 30 of the feed shaft (not shown) and the above-described position command.

The motor control unit 12 generates a torque command for the motor 30, which drives the feed shaft, based on the superimposition command generated by the above-described adder 13, and controls the motor 30 with the generated torque command. Thus, the motor 30, which drives the feed shaft, reaches the command position with oscillation.

The input unit 14 is an input unit that can input at least one of various parameters required for the first oscillation condition determination unit 111 to determine the first oscillation condition, various parameters for the second oscillation condition calculation unit 112 to calculate the second oscillation condition, a priority condition to be described later, or the margin. Specifically, the input unit 14 can input the variable numbers in the above-described numerical expressions (2-1), (2-2), and (2-3), the chip length, the surface roughness, the width of oscillation, the upper limit value of the first oscillation condition, the priority condition to be described later, and the margin, for example. The input value input through the input unit 14 by the user enables determination of the first oscillation condition, and calculation and determination of the second oscillation condition.

The display unit 15 is a display unit that can display at least one of the input value input by the input unit 14, the first oscillation condition determined by the first oscillation condition determination unit 111, the second oscillation condition calculated by the second oscillation condition calculation unit 112, or various specifications determined from the first oscillation condition and the second oscillation condition. The various specifications include the chip length, the surface roughness, the variation surface roughness, the width of oscillation, and the operation parameters of the machine tool. The display on the display unit 15 makes it easy for the user to set and confirm the oscillation condition.

Figure 5:
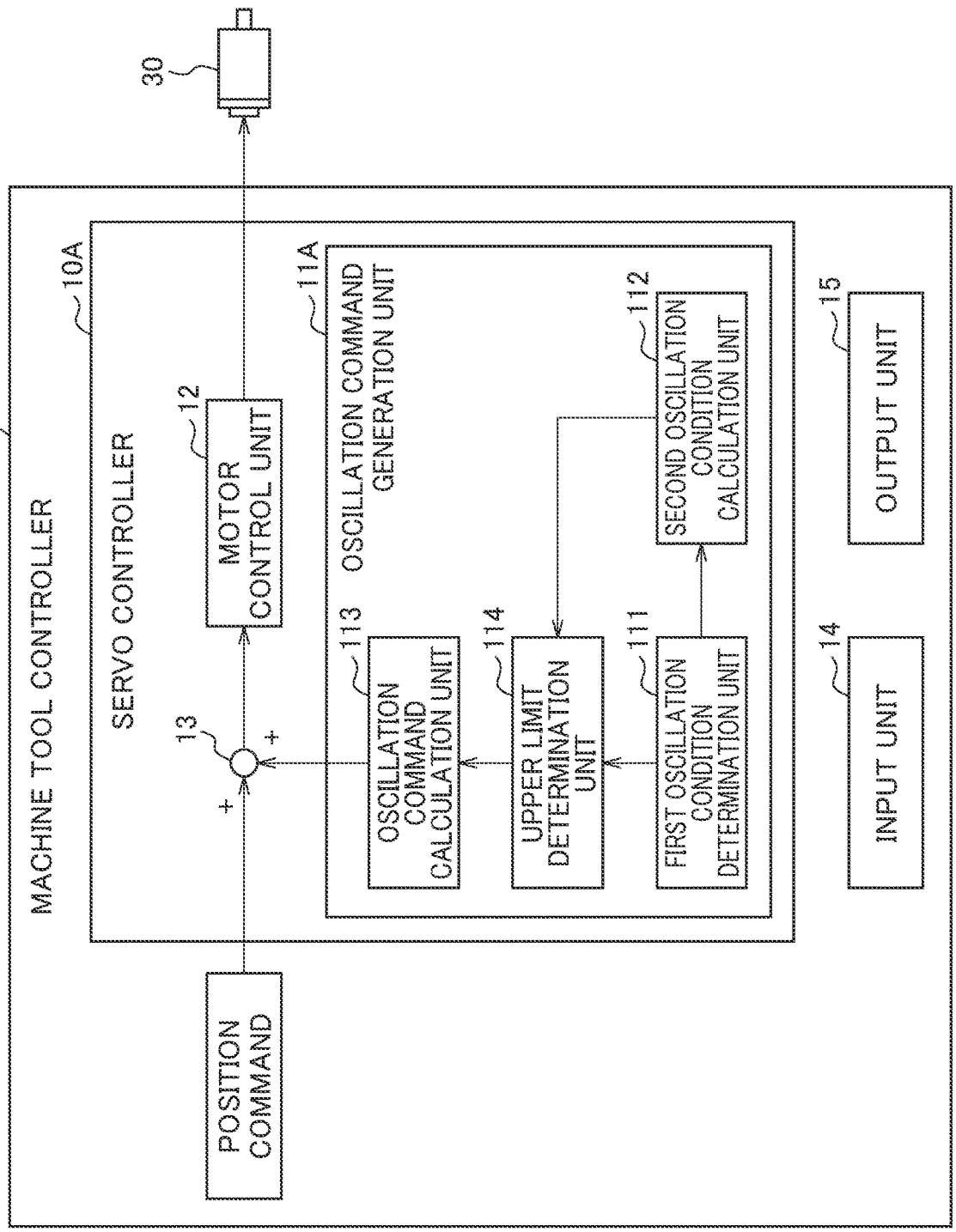
FIG. 5 is a functional block diagram of a machine tool controller according to a second embodiment of the present disclosure.

Next, a second embodiment of the present disclosure will be described with reference to FIG. 5. FIG. 5 is a functional block diagram of a machine tool controller 1A according to the second embodiment of the present disclosure. As shown in FIG. 5, the machine tool controller 1A according to the second embodiment has the same constitution as the machine tool controller 1 according to the above-described first embodiment except for an oscillation command generation unit 11A and a servo controller 10A. Specifically, in the second embodiment, an upper limit determination unit 114 is provided to change the first oscillation condition based on at least one of the upper limit value of the second oscillation condition or the upper limit value of the operation parameters of the machine tool.

When the upper limit determination unit 114 makes a determination based on the upper limit value of the second oscillation condition, regarding the second oscillation condition calculated from the first oscillation condition, the second oscillation condition is clamped by the upper limit value determined from the operation upper limit of the machine tool. When the clamp is applied, the second oscillation condition and the first oscillation condition are calculated backward from the above-described numerical expression (2-1). The first oscillation condition and the second oscillation condition, which are determined, are notified to the oscillation command calculation unit 113.

Further, a case will be described in which the upper limit determination unit 114 makes a determination based on the upper limit value of the operation parameters of the machine tool. The operation parameters of the machine tool include, for example a feed rate and a feed acceleration. When the feed rate and acceleration is limited, the maximum feed rate and maximum acceleration are calculated using the following numerical expressions (3-1) to (3-5).

[Math. 3]

$$Y = \frac{FS}{60}t + \frac{KF}{2}\left\{\cos\left(2\pi\frac{SI}{60}t\right) - 1\right\} \quad \text{NUMERICAL EXPRESSION (3-1)}$$

$$Y' = \frac{FS}{60}\left(1 - \pi KI\sin\left(2\pi\frac{SI}{60}t\right)\right) \quad \text{NUMERICAL EXPRESSION (3-2)}$$

MAXIMUM FEED RATE DURING OSCILLATION $= \frac{FS}{60}(1 + \pi KI)$  NUMERICAL EXPRESSION (3-3)

$$Y'' = -\frac{KF}{2}\cdot\left(2\pi\frac{SI}{60}\right)^2\cos\left(2\pi\frac{SI}{60}t\right) \quad \text{NUMERICAL EXPRESSION (3-4)}$$

MAXIMUM ACCELERATION DURING OSCILLATION $= \frac{Fk}{60}\left(2\pi\frac{SI}{60}\right)^2$  NUMERICAL EXPRESSION (3-5)

Here, in the numerical expressions (3-1) to (3-5) described above, Y represents a movement command (position command), F represents a feed rate (mm/rotation), S represents spindle rpm (minute$^{-1}$), I represents a frequency multiplying factor, and K represents an amplitude multiplying factor. The amplitude multiplying factor K and the frequency multiplying factor I, which correspond to the second oscillation condition, are limited such that the maximum feed rate and the maximum acceleration calculated using the above numerical expressions (3-1) to (3-5) do not exceed the upper limit value. The above numerical expressions (2-2) and (2-3) are used for conversion to the oscillation amplitude and the oscillation frequency.

Figure 6:
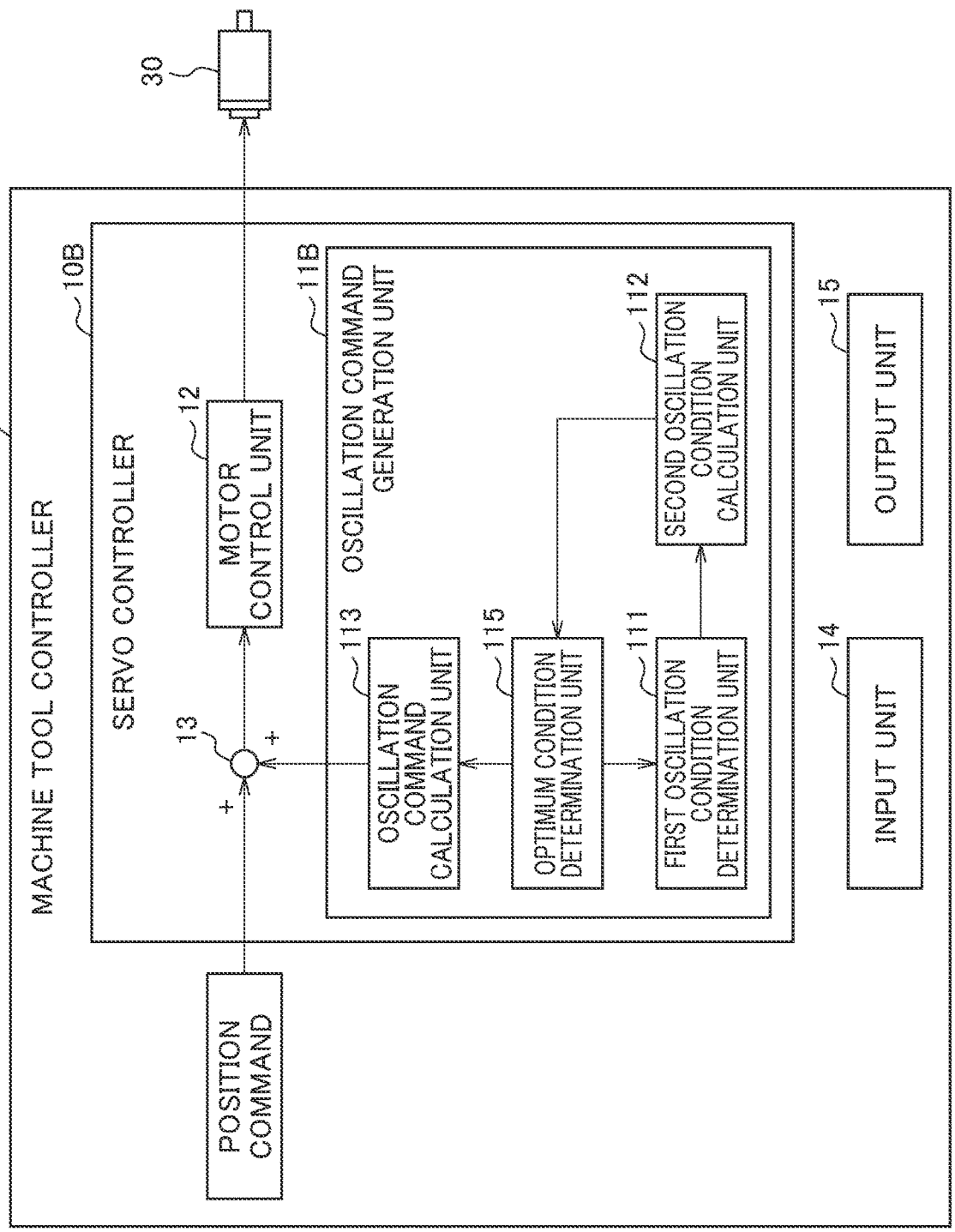
FIG. 6 is a functional block diagram of a machine tool controller according to a third embodiment of the present disclosure.

Next, a third embodiment of the present disclosure will be described with reference to FIG. 6. FIG. 6 is a functional block diagram of a machine tool controller 1B according to the third embodiment of the present disclosure. As shown FIG. 6, the machine tool controller 1B according to the third embodiment has the same constitution as the machine tool controller 1 according to the above-described first embodiment and the machine tool controller 1A according to the above-described second embodiment except for an oscillation command generation unit 11B and a servo controller 10B. Specifically, in the third embodiment, an optimum condition determination unit 115 is provided to set, as a priority condition, at least one of the chip length, the surface roughness, the frequency parameter, the amplitude parameter, the operation parameters of the machine tool, or various specifications determined from these.

The various specifications include, for example, a width of oscillation and a variation in surface roughness. The optimum condition determination unit 115 notifies the first oscillation condition determination unit 111 of the first oscillation condition in order to calculate the corresponding second oscillation condition from the first oscillation condition within a predetermined range. Based on the notification, the first oscillation condition determination unit 111 and the second oscillation condition calculation unit 112 determine the first oscillation condition and the second oscillation condition. The optimum condition determination unit 115 calculates a priority condition based on the first oscillation condition and the second oscillation condition. At the same time, the optimum condition determination unit 115 confirms whether to satisfy the upper limit value of all conditions excluding the priority condition. The optimum condition determination unit 115 confirms the priority condition for the first oscillation condition within the predetermined range, and notifies the oscillation command calculation unit 113 of the first oscillation condition and the second oscillation condition that satisfy the upper limit value of all conditions and minimize the priority condition.

Specifically, for example, when the priority condition is the feed acceleration, the oscillation command is calculated from the first oscillation condition and the second oscillation condition, and the maximum feed acceleration under the command is calculated. At the same time, whether to exceed the upper limit value of all conditions including the feed acceleration is confirmed, and only a case where all the upper limit values are satisfied is recorded. The confirmation is continued until the first oscillation condition is gradually lowered from the upper limit value and the upper limit value of all the conditions cannot be satisfied. When the confirmation is completed, the oscillation command calculation unit 113 is notified of the first oscillation condition and the second oscillation condition in which the feed acceleration is the smallest.

A procedure of the cutting process according to the embodiments of the present disclosure will be described with reference to FIG. 7. Here, FIG. 7 is a flowchart showing the procedure of the cutting process according to the embodiments of the present disclosure.

First, in Step S1, a first oscillation condition is determined. As the first oscillation condition, one of the frequency parameter and the amplitude parameter is selected.

In Step S2, a second oscillation condition is calculated based on the first oscillation condition determined in Step S1. As the second oscillation condition, the other of the frequency parameter and the amplitude parameter is selected. In other words, the other of the frequency parameter and the amplitude parameter, which is not selected as the first oscillation condition in Step S2, is calculated.

In Step S3, an oscillation command is calculated based on the first oscillation condition determined in Step S1 and the second oscillation condition calculated in Step S2.

In Step S4, a superimposition command is generated by superimposing the oscillation command calculated in Step S3 on a position command. Then, the generated superimposition command controls the driving of the motor 30 that drives the feed shaft. Finally, this process is ended.

According to the embodiments of the present disclosure, the following effects are achieved.

(1) In the embodiments of the present disclosure, the first oscillation condition determination unit 111 is provided to determine, as the first oscillation condition, one of the frequency parameter and the amplitude parameter, the frequency parameter including the frequency or the frequency multiplying factor of the oscillation command, the amplitude parameter including the amplitude or the amplitude multiplying factor of the oscillation command. Further, the second oscillation condition calculation unit 112 is provided to calculate, as the second oscillation condition, the other of the frequency parameter and the amplitude parameter, based on the first oscillation condition determined by the first oscillation condition determination unit 111. Since the frequency parameter and the amplitude parameter are correlated with each other, one condition is determined under a certain condition, and then the other is calculated and determined in the embodiments of the present disclosure, whereby the time for setting conditions can be shortened as compared with the conventional technique. Therefore, according to the embodiments of the present disclosure, it is possible to quickly determine the frequency parameter and the amplitude parameter of the desired oscillation command capable of shredding the chips.

(2) In the embodiments of the present disclosure, the second oscillation condition calculation unit 112 calculates the second oscillation condition based on the first oscillation condition and either the number of tools or the number of blades. Thereby, it is possible to more reliably and quickly determine the frequency parameter and the amplitude parameter of the desired oscillation command capable of shredding the chips.

(3) in the embodiments of the present disclosure, the first oscillation condition determination unit 111 determines the first oscillation condition based on at least one of the chip length, the surface roughness of the workpiece W, the width of oscillation, or the upper limit value of the first oscillation condition. Thus, it is possible to determine the first oscillation condition and the second oscillation condition constituting the oscillation command so as to obtain the desired chip length, the surface roughness, and the width of oscillation, or not to exceed the upper limit value of the frequency and the amplitude determined according to the machine tool.

(4) In the embodiments of the present disclosure, the upper limit determination unit 114 is provided to change the first oscillation condition based on at least one of the upper limit value of the second oscillation condition or the upper limit value of the operation parameters of the machine tool. Thus, it is possible to determine the first oscillation condition and the second oscillation condition constituting the oscillation command so as not to exceed the upper limit value of the second oscillation condition and the upper limit value of the operation parameters of the machine tool.

(5) in the embodiments of the present disclosure, the optimum condition determination unit 115 is provided to set, as the priority condition, at least one of the chip length, the surface roughness of the workpiece, the frequency parameter, the amplitude parameter, the operation parameters of the machine tool, or various specifications determined from these. Then, the optimum condition determination unit 115 determines the first oscillation condition and the second oscillation condition that minimize the priority condition, based on the second oscillation condition calculated from the first oscillation condition within the predetermined range. Thereby, when there are a plurality of first oscillation conditions that can satisfy each condition, it is possible to confirm the priority condition for the first oscillation condition within the predetermined range, and to determine the first oscillation condition and the second oscillation condition that satisfy the upper limit value of all conditions and minimize the priority condition (6) in the embodiments of the present disclosure, the second oscillation condition calculation unit 112 calculates the second oscillation condition using the above numerical expressions (2-1), (2-2), and (2-3). Thus, it is possible to reliably calculate the other of the frequency parameter and the amplitude parameter, based on one of the frequency parameter and the amplitude parameter determined by the first oscillation condition determination unit 111.

(7) In the embodiments of the present disclosure, the second oscillation condition calculation unit 112 calculates the amplitude parameter as the second oscillation condition including the margin that is based on the cutting tip of the tool T and the shaking of the workpiece W. Since the cutting tip (machine tip) of the cutting tool T and the workpiece W bend and shake due to the oscillation, according to the embodiments, the idle swing C can be more surely generated by calculation of the amplitude parameter including the margin based on the related shaking.

(8) In the embodiments of the present disclosure, at least one of the input unit 14 or the display unit 15 is provided. Here, the input unit 14 is an input unit that can input at least one of various parameters required for the first oscillation condition determination unit 111 to determine the first oscillation condition, various parameters for the second oscillation condition calculation unit 112 to calculate the second oscillation condition, the priority condition, or the margin. Further, the display unit 15 is a display unit that can display at least one of the input content input by the input unit 14, the first oscillation condition determined by the first oscillation condition determination unit 111, the second oscillation condition calculated by the second oscillation condition calculation unit 112, or various specifications determined from the first oscillation condition and the second oscillation condition. Thereby, the input value input through the input unit 14 by the user enables determination of the first oscillation condition, and calculation and determination of the second oscillation condition. Further, the display on the display unit 15 makes it easy for the user to set and confirm the oscillation condition.

The present invention is not limited to the above embodiments, and the present invention includes modifications and improvements within the range in which the object of the present invention can be achieved.

For example, a learning control unit may be provided in the machine tool controller 1 according to the above embodiment. The learning control unit calculates a compensation amount of the superimposition command based on the integrated value of the position error up to one learning cycle, and superimposes the calculated compensation amount on the superimposition command for the purpose of compensation. In the above embodiments, the superimposition command includes the oscillation command, whereby the position error is likely to occur, and the followability to the periodic oscillation command can be improved due to the compensation by the learning control unit.

EXPLANATION OF REFERENCE NUMERALS

1, 1A, 1B: Machine tool controller
10, 10A, 10B: Servo controller
11, 11A, 11B: Oscillation command generation unit
12: Motor control unit
13: Adder
14: Input unit
15: Display unit
30: Motor
111: First oscillation condition determination unit
112: Second oscillation condition calculation unit
113: Oscillation command calculation unit
114: Upper limit determination unit
115: Optimum condition determination unit
C: Idle swing
P: Tool path
S: Spindle
T: Cutting tool
W: Workpiece
Z: Feed direction

The invention claimed is:

1. A machine tool controller for a machine tool that performs machining while causing a tool and a workpiece to oscillate relative to each other, the machine tool controller comprising:
a processor,
the processor being configured to:
calculate an oscillation command;
determine, as a first oscillation condition, one of a frequency parameter and an amplitude parameter, the frequency parameter including a frequency or a frequency multiplying factor of the oscillation command, the amplitude parameter including an amplitude or an amplitude multiplying factor of the oscillation command;
calculate, as a second oscillation condition, the other of the frequency parameter and the amplitude parameter, based on the first oscillation condition determined; and
change the first oscillation condition based on an upper limit value of a feed rate or an upper limit value of a feed acceleration, the feed rate and the feed acceleration being included in operation parameters of the machine tool.

2. The machine tool controller according to claim 1, wherein the processor calculates the second oscillation condition based on the first oscillation condition and either the number of the tool or the number of blades.

3. The machine tool controller according to claim 1, wherein the processor determines the first oscillation condition based on at least one of a chip length, surface roughness of the workpiece, a width of the oscillation, or an upper limit value of the first oscillation condition.

4. The machine tool controller according to claim 1, wherein the processor calculates the second oscillation condition according to numerical expressions (2-1), (2-2), and (2-3) below,

[Math. 1]

$$nK \cdot \left| \sin\left(\frac{\pi I}{n}\right) \right| > 1 \quad \text{NUMERICAL EXPRESSION (2-1)}$$

$$\frac{SI}{60} = I' \quad \text{NUMERICAL EXPRESSION (2-2)}$$

$$FK = K' \quad \text{NUMERICAL EXPRESSION (2-3)}$$

where, in the numerical expressions (2-1), (2-2), and (2-3), I represents a frequency multiplying factor, K represents an amplitude multiplying factor, n represents the number of the tool or the number of tool blades, I' represents a vibration frequency (Hz), S represents spindle rpm (minute$^{-1}$), K' represents an amplitude (mm), and F represents a feed rate (mm/rotation).

5. The machine tool controller according to claim 1, wherein the processor calculates the amplitude parameter as the second oscillation condition including a margin.

6. The machine tool controller according to claim 1, wherein the processor is further configured to:
input at least one of various parameters required for determining the first oscillation condition, various parameters required for calculating the second oscillation condition, or a margin; or
display at least one of an input content inputted, the first oscillation condition determined, the second oscillation condition calculated, or various specifications determined from the first oscillation condition and the second oscillation condition.

7. A machine tool controller for a machine tool that performs machining while causing a tool and a workpiece to oscillate relative to each other, the machine tool controller comprising:
a processor,
the processor being configured to:
calculate an oscillation command;
determine, as a first oscillation condition, one of a frequency parameter and an amplitude parameter, the frequency parameter including a frequency or a frequency multiplying factor of the oscillation command, the amplitude parameter including an amplitude or an amplitude multiplying factor of the oscillation command;
calculate, as a second oscillation condition, the other of the frequency parameter and the amplitude parameter, based on the first oscillation condition determined; and
set, as a priority condition, at least one of a chip length, surface roughness of the workpiece, the frequency parameter, the amplitude parameter, an operation parameter of the machine tool, or various specifications determined from these, wherein
the processor determines the first oscillation condition and the second oscillation condition that satisfy upper limit values of all of the first oscillation condition, the second oscillation condition, the frequency parameter, the amplitude parameter, a feed rate, and a feed acceleration, except for the priority condition and that minimize the priority condition based on the second oscillation condition calculated from the first oscillation condition within a predetermined range.

8. The machine tool controller according to claim 7, wherein the processor is further configured to:
   input at least one of various parameters required for determining the first oscillation condition, various parameters required for calculating the second oscillation condition, the priority condition, or a margin; or
   display at least one of an input content inputted, the first oscillation condition determined, the second oscillation condition calculated by, or various specifications determined from the first oscillation condition and the second oscillation condition.

9. The machine tool controller according to claim 7, wherein the processor calculates the second oscillation condition based on the first oscillation condition and either the number of the tool or the number of blades.

10. The machine tool controller according to claim 7, wherein the processor determines the first oscillation condition based on at least one of a chip length, surface roughness of the workpiece, a width of the oscillation, or an upper limit value of the first oscillation condition.

11. The machine tool controller according to claim 7, wherein the processor calculates the second oscillation condition according to numerical expressions (2-1), (2-2), and (2-3) below,

[Math. 1]

$$nK \cdot \left|\sin\left(\frac{\pi I}{n}\right)\right| > 1 \quad \text{NUMERICAL EXPRESSION (2-1)}$$

$$\frac{SI}{60} = I' \quad \text{NUMERICAL EXPRESSION (2-2)}$$

$$FK = K' \quad \text{NUMERICAL EXPRESSION (2-3)}$$

where, in the numerical expressions (2-1), (2-2), and (2-3), I represents a frequency multiplying factor, K represents an amplitude multiplying factor, n represents the number of the tool or the number of tool blades, I' represents a vibration frequency (Hz), S represents spindle rpm (minute$^{-1}$), K' represents an amplitude (mm), and F represents a feed rate (mm/rotation).

12. The machine tool controller according to claim 7, wherein the processor calculates the amplitude parameter as the second oscillation condition including a margin.

13. The machine tool controller according to claim 7, wherein the processor is further configured to:
   input at least one of various parameters required for determining the first oscillation condition, various parameters required for calculating the second oscillation condition, the priority condition, or a margin; or
   display at least one of an input content inputted, the first oscillation condition determined, the second oscillation condition calculated, or various specifications determined from the first oscillation condition and the second oscillation condition.

14. A machine tool controller for a machine tool that performs machining while causing a tool and a workpiece to oscillate relative to each other, the machine tool controller comprising:
   a processor,
   the processor being configured to:
   calculate an oscillation command;
   determine, as a first oscillation condition, one of a frequency parameter and an amplitude parameter, the frequency parameter including a frequency or a frequency multiplying factor of the oscillation command, the amplitude parameter including an amplitude or an amplitude multiplying factor of the oscillation command;
   calculate, as a second oscillation condition, the other of the frequency parameter and the amplitude parameter, based on the first oscillation condition determined; and
   clamp the second oscillation condition by an upper limit value determined from an operation upper limit of the machine tool, and change the first oscillation condition based on the second oscillation condition clamped.

15. The machine tool controller according to claim 14, wherein the processor calculates the second oscillation condition based on the first oscillation condition and either the number of the tool or the number of blades.

16. The machine tool controller according to claim 14, wherein the processor determines the first oscillation condition based on at least one of a chip length, surface roughness of the workpiece, a width of the oscillation, or an upper limit value of the first oscillation condition.

17. The machine tool controller according to claim 14, wherein the processor calculates the second oscillation condition according to numerical expressions (2-1), (2-2), and (2-3) below,

[Math. 1]

$$nK \cdot \left|\sin\left(\frac{\pi I}{n}\right)\right| > 1 \quad \text{NUMERICAL EXPRESSION (2-1)}$$

$$\frac{SI}{60} = I' \quad \text{NUMERICAL EXPRESSION (2-2)}$$

$$FK = K' \quad \text{NUMERICAL EXPRESSION (2-3)}$$

where, in the numerical expressions (2-1), (2-2), and (2-3), I represents a frequency multiplying factor, K represents an amplitude multiplying factor, n represents the number of the tool or the number of tool blades, I' represents a vibration frequency (Hz), S represents spindle rpm (minute$^{-1}$), K' represents an amplitude (mm), and F represents a feed rate (mm/rotation).

18. The machine tool controller according to claim 14, wherein the processor calculates the amplitude parameter as the second oscillation condition including a margin.

19. The machine tool controller according to claim 14, wherein the processor is further configured to:
   input at least one of various parameters required for determining the first oscillation condition, various parameters required for calculating the second oscillation condition, or a margin; or
   display at least one of an input content inputted, the first oscillation condition determined, the second oscillation condition calculated, or various specifications determined from the first oscillation condition and the second oscillation condition.

\* \* \* \* \*